US012468252B2

(12) United States Patent
Iwasaki et al.

(10) Patent No.: US 12,468,252 B2
(45) Date of Patent: Nov. 11, 2025

(54) CHARGE ELIMINATING APPARATUS, IMAGE FORMING SYSTEM, AND CHARGE ADJUSTING APPARATUS

(71) Applicant: CANON KABUSHIKI KAISHA, Tokyo (JP)

(72) Inventors: Shin Iwasaki, Chiba (JP); Hiroyuki Eda, Ibaraki (JP); Ryou Sakaguchi, Chiba (JP); Riki Fukuhara, Chiba (JP); Yuko Shimpo, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/634,099

(22) Filed: Apr. 12, 2024

(65) Prior Publication Data

US 2024/0353786 A1 Oct. 24, 2024

(30) Foreign Application Priority Data

Apr. 24, 2023 (JP) ................................ 2023-070974
Jan. 26, 2024 (JP) ................................ 2024-010581

(51) Int. Cl.
*G03G 21/06* (2006.01)
*G03G 15/00* (2006.01)

(52) U.S. Cl.
CPC ......... *G03G 21/06* (2013.01); *G03G 15/5016* (2013.01); *G03G 15/6529* (2013.01); *G03G 2215/00679* (2013.01)

(58) Field of Classification Search
CPC ........... G03G 15/0266; G03G 15/6573; G03G 15/1675; G03G 21/06; G03G 15/657
See application file for complete search history.

(56) References Cited

U.S. PATENT DOCUMENTS 11,681,238 B2 6/2023 Azami
2010/0129100 A1 * 5/2010 Oyoshi ................. G03G 15/50 399/68
2021/0216027 A1 * 7/2021 Tanaka ............... G03G 15/6573

FOREIGN PATENT DOCUMENTS

JP 2019167169 A 10/2019
JP 2022171206 A 11/2022

* cited by examiner

*Primary Examiner* — Jessica L Eley
(74) *Attorney, Agent, or Firm* — ROSSI, KIMMS & McDOWELL LLP

(57) ABSTRACT

A charge eliminating apparatus includes a conveying unit configured to convey a sheet, a charge eliminating member configured to eliminate charge of the sheet conveyed by the conveying unit, a setting unit configured to set a charge elimination amount by the charge eliminating member, and a controller configured to control both a voltage applied to the charge eliminating member and a sheet conveyance speed of the conveying unit based on the charge elimination amount set by the setting unit.

10 Claims, 8 Drawing Sheets

FIG.6

| | CHARGE ELIMINATION LEVEL | CONTACT-TYPE CHARGE ELIMINATING UNIT | NONCONTACT-TYPE CHARGE ELIMINATING UNIT | CHARGE ELIMINATION CONVEYANCE SPEED |
|---|---|---|---|---|
| | 0 | 0V | 800V | 550mm/sec |
| FIRST PROCESSING | 1 | -1000V | 800V | 550mm/sec |
| FIRST PROCESSING | 2 | -2000V | 800V | 550mm/sec |
| FIRST PROCESSING | 3 | -3000V | 800V | 550mm/sec |
| FIRST PROCESSING | 4 | -4000V | 800V | 550mm/sec |
| FIRST PROCESSING | 5 | -5000V | 800V | 550mm/sec |
| SECOND PROCESSING | 6 | -5000V | 800V | 500mm/sec |
| SECOND PROCESSING | 7 | -5000V | 800V | 450mm/sec |
| SECOND PROCESSING | 8 | -5000V | 800V | 400mm/sec |
| SECOND PROCESSING | 9 | -5000V | 800V | 350mm/sec |

CHARGE ELIMINATING APPARATUS, IMAGE FORMING SYSTEM, AND CHARGE ADJUSTING APPARATUS

BACKGROUND OF THE INVENTION

Field of the Invention

The present invention relates to a charge eliminating apparatus for eliminating charge of sheet-like recording materials, an image forming system adopting the charge eliminating apparatus, and a charge adjusting apparatus for adjusting charge of sheet-like recording materials.

Description of the Related Art

Hitherto, in image forming apparatuses adopting an electrophotographic system, charge may be generated on the sheet after an image is formed thereto, since a high voltage is applied to the sheet when forming an image thereon. Therefore, conveyance failure may occur by electrostatic attraction of the sheet to a conveyance path within the apparatus, or stacking failure may occur by electrostatic force that is generated between sheets when stacking the sheets discharged from the apparatus. Regarding such problems, a charge eliminating apparatus for removing static electricity of the sheets is proposed. As the charge eliminating apparatus, for example, there has been developed an apparatus equipped with two charge eliminating units, which are a contact-type charge eliminating unit that comes into contact with the sheets being conveyed, and a noncontact-type charge eliminating unit disposed downstream of the contact-type charge eliminating unit in the conveyance direction (refer to Japanese Patent Application Laid-Open Publication No. 2019-167169). Further, there is known a charge adjusting apparatus for solving stacking failure by applying voltage to every other sheet of the sheets being conveyed, such that the respective surfaces of sheets being stacked and facing one another are charged to the same polarity (refer to Japanese Patent Application Laid-Open Publication No. 2022-171206).

Hitherto, charge eliminating apparatuses adopt a configuration in which the charge eliminating unit to be used for eliminating charge may be selected from two charge eliminating units, which are the contact-type charge eliminating unit and the noncontact-type charge eliminating unit, based on a sheet resistance. Further, the charge eliminating apparatus determines a charge elimination bias, or applied voltage, of the contact-type charge eliminating unit based on a predicted or measured surface potential of the sheet.

However, according to the conventional charge eliminating apparatus, when the charged sheet is eliminated of charge, the charge elimination bias is adjusted in response to the surface potential of the sheet being the target of charge elimination. Therefore, if a necessary charge elimination amount according to the physical property of the sheet is great, the elimination of charge of the sheet may not be sufficient by simply adjusting the charge elimination bias. According further to the charge adjusting apparatus, charge of the sheet may not be appropriately adjusted by merely adjusting the voltage applied to the sheet.

The present invention provides a charge eliminating apparatus, an image forming system, and a charge adjusting apparatus that may increase the charge elimination amount when eliminating charge of a charged sheet or increase a charge adjustment amount of the charge of the sheet.

SUMMARY OF THE INVENTION

According to a first aspect of the present invention, a charge eliminating apparatus includes a conveying unit configured to convey a sheet, a charge eliminating member configured to eliminate charge of the sheet conveyed by the conveying unit, a setting unit configured to set a charge elimination amount by the charge eliminating member, and a controller configured to control both a voltage applied to the charge eliminating member and a sheet conveyance speed of the conveying unit based on the charge elimination amount set by the setting unit.

According to a second aspect of the present invention, an image forming system includes an image forming apparatus configured to form an image on a sheet, and the charge eliminating apparatus configured to receive and eliminate charge of the sheet on which the image has been formed by the image forming apparatus.

According to a third aspect of the present invention, a charge adjusting apparatus includes a conveying unit configured to convey a sheet, a charge adjusting member configured to adjust charge of the sheet conveyed by the conveying unit, a setting unit configured to set a charge adjustment amount by the charge adjusting member, and a controller configured to control both a voltage applied to the charge adjusting member and a sheet conveyance speed of the conveying unit based on the charge adjustment amount set by the setting unit.

Further features of the present invention will become apparent from the following description of exemplary embodiments with reference to the attached drawings.

BRIEF DESCRIPTION OF THE DRAWINGS

FIG. 6 is a table illustrating a relationship among charge elimination level, charge eliminating voltage that is applied in the contact-type charge eliminating unit and the noncontact-type charge eliminating unit, and conveyance speed.

DESCRIPTION OF THE EMBODIMENTS

The present embodiment will be described below with reference to the drawings. At first, a schematic configuration of an image forming system 1 according to the present embodiment will be described with reference to FIG. 1. Dimensions, materials, and relative positions of the components of the image forming system 1 are not intended to limit the scope of the present invention thereto, unless denoted otherwise. Further, according to the present embodiment, a full-color copying machine having a plurality of photosensitive drums is applied as an image forming apparatus 2 of the image forming system 1. However, the present technique is not limited thereto, and the technique may be applied to a monochrome or mono-color copying machine or printer having only one photosensitive drum.

Image Forming System

Figure 1:
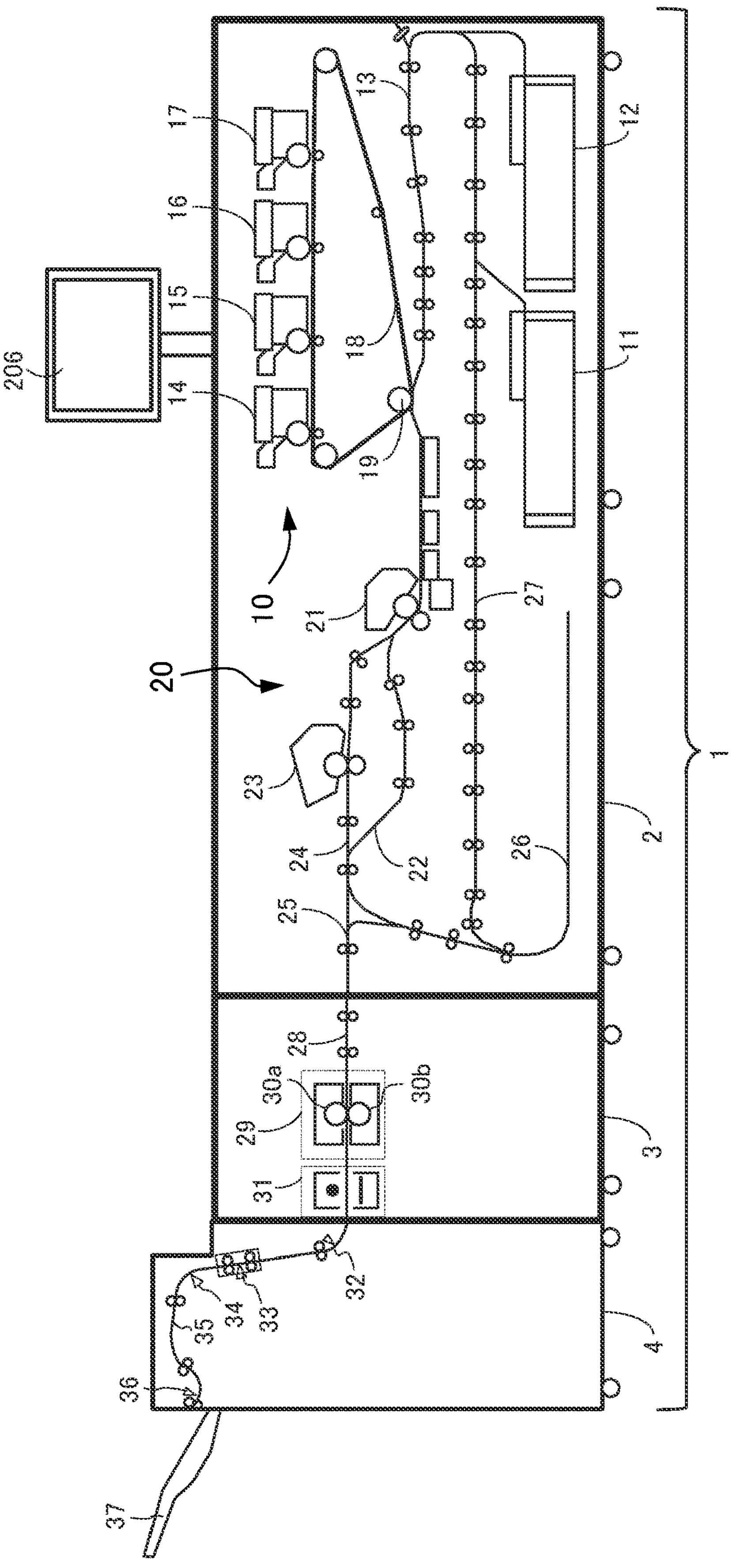
FIG. 1 is a cross-sectional view illustrating an image forming system according to an embodiment.

FIG. 1 is a cross-sectional view illustrating a configuration of a main portion of the image forming system 1 according to the present embodiment. The image forming system 1 includes the image forming apparatus 2 for forming an image on a sheet S, a charge eliminating apparatus 3, and a finisher 4.

The image forming apparatus 2 includes sheet feed decks 11 and 12, an image forming unit 10, a fixing unit 20, and a display 206. Each of the sheet feed decks 11 and 12 may store various types of sheets S. In each of the sheet feed decks 11 and 12, a single uppermost sheet S may be separated from the stored sheets S and conveyed to a conveyance path 13. The display 206 displays a printing state and information related to setting of the image forming system 1.

The fixing unit 20 is provided to fix a toner image to the sheet S, and includes a first fixing unit 21 and a second fixing unit 23. The first fixing unit 21 includes a heating roller and a pressing roller, and by having the sheet S pass through the respective rollers, toner is melted and pressed, by which the toner image is fixed to the sheet S. The sheet S having exited the first fixing unit 21 is passed through a conveyance path 22 and conveyed to a conveyance path 25. In a case where further melting and pressing is necessary depending on the type of the sheet S, after passing through the first fixing unit 21, the sheet is conveyed to the second fixing unit 23 through an upper conveyance path, where additional melting and pressing is applied thereto. Thereafter, the sheet S is conveyed through a conveyance path 24 to the conveyance path 25. In the case where an image forming mode is duplex printing, the sheet S is conveyed to a sheet reverse conveyance path 26, reversed in the sheet reverse conveyance path 26, and conveyed to a duplex conveyance path 27, where image transfer is executed to a second side that is opposite to a first side of the sheet by a secondary transfer roller 19.

The charge eliminating apparatus 3 receives the sheet S on which the image has been formed by the image forming apparatus 2, and eliminates charge of the sheet S. The charge eliminating apparatus 3 includes a conveyance path 28 that receives the sheets S having passed through the conveyance path 25, and a contact-type charge eliminating unit 29 and a noncontact-type charge eliminating unit 31 that eliminate charge of the received sheets S. According to the charge eliminating apparatus 3, charge elimination of the sheet S is performed by applying a high voltage to the contact-type charge eliminating unit 29 and the noncontact-type charge eliminating unit 31. The sheet S having passed through the contact-type charge eliminating unit 29 and the noncontact-type charge eliminating unit 31 and subjected to charge elimination processing is conveyed to the finisher 4.

The finisher 4 is a sheet supporting apparatus capable of supporting a large amount of sheets S conveyed from the charge eliminating apparatus 3. The finisher 4 includes a conveyance path 35 through which the sheets S conveyed from the charge eliminating apparatus 3 are received, and a stack tray 37 that is disposed continuously from the conveyance path 35 and that supports the sheets S. Conveyance sensors 32, 33, 34, and 36 that detect the passing of a sheet S are disposed on the conveyance path 35. If a leading edge of a sheet or a trailing edge of a sheet has not been detected by the conveyance sensors 32, 33, 34, and 36 in the finisher 4 even after a predetermined time has elapsed, it is determined that sheet jamming has occurred in the finisher 4, and the image forming apparatus 2 is notified that jamming has occurred.

Control System of Image Forming System

Figure 2:
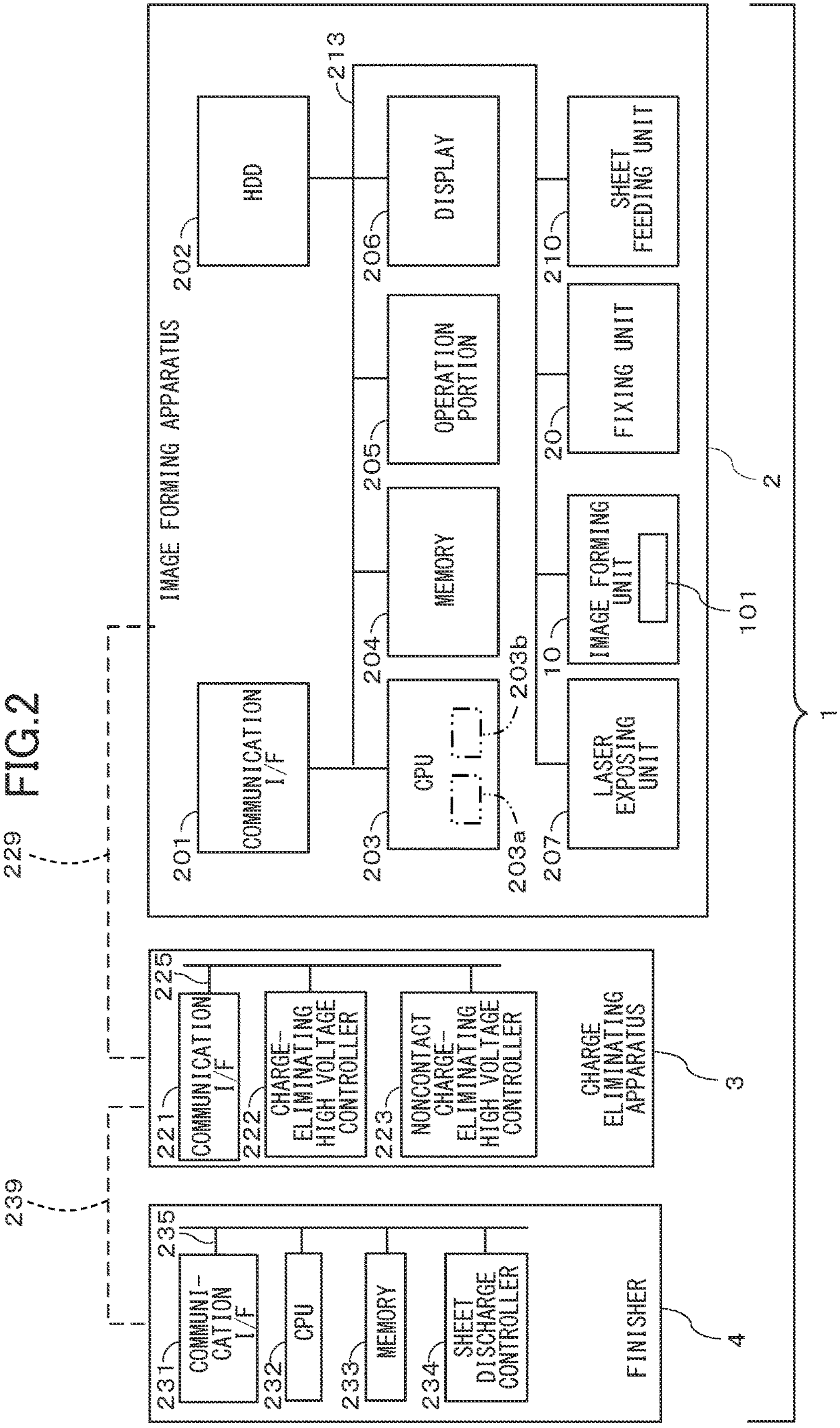
FIG. 2 is a control block diagram illustrating a control system of the image forming system according to the embodiment.

FIG. 2 is a block diagram illustrating a system configuration of the image forming system 1. At first, a control system of the image forming apparatus 2 will be described. The image forming apparatus 2 includes a communication I/F 201, an HDD 202, a CPU 203, a memory 204, an operation portion 205, the display 206, a laser exposing unit 207, the image forming unit 10, the fixing unit 20, and a sheet feeding unit 210. The respective components are connected through a system bus 213.

The communication I/F 201 is connected to the charge eliminating apparatus 3 through a communication cable 229, and communication is performed for controlling the respective apparatuses. The HDD 202 is a storage device for storing programs and data. The CPU 203 performs image processing control and printing control comprehensively based on programs stored in the HDD 202. In the present embodiment, the CPU 203 is one example of a controller that controls the contact-type charge eliminating unit 29 and the noncontact-type charge eliminating unit 31. The memory 204 stores programs required by the CPU 203 for performing various processing and image data, and operates as a work area.

The operation portion 205 receives input of various settings and operation instructions from the user. Setting information and processing states of a print job of the image forming apparatus 2 are displayed on the display 206. The laser exposing unit 207 performs primary charge for irradiating the photosensitive drum with laser light for transferring a toner image thereto, and executes laser exposure. In the laser exposing unit 207, at first, primary charge is performed to charge a surface of the photosensitive drum to a uniform negative potential. Next, the photosensitive drum is irradiated with laser light from a laser driver with a reflection angle of laser light adjusted using a polygon mirror. Thereby, negative charge of the portion having been irradiated is neutralized, and an electrostatic latent image is formed.

The image forming unit 10 is an apparatus for forming a toner image and transferring the toner image onto a sheet S, composed of an image developing unit, a transfer unit, and a toner replenishment unit, and transfers the toner image on the photosensitive drum through an intermediate transfer belt 18 to the sheet S. In the image developing unit, negatively charged toner from a developing cylinder is attached to an electrostatic latent image on the surface of the photosensitive drum, and the image is visualized. In the transfer unit, primary transfer of applying a positive potential to the primary transfer roller and transferring the toner image on the surface of the photosensitive drum to the intermediate transfer belt 18, and a secondary transfer of applying a positive potential to a secondary transfer outer roller not shown and transferring the toner image on the intermediate transfer belt 18 to the sheet S are performed. The fixing unit 20 is a device for melting the toner on the sheet S and fixing the same to the sheet S by heat and pressure, and it is composed of the first fixing unit 21 and the second fixing unit 23. The sheet feeding unit 210 is a device for feeding the sheets S, and the feeding operation and the conveying operation of the sheets S are controlled through rollers and various sensors.

Next, a control system of the charge eliminating apparatus 3 will be described. The charge eliminating apparatus 3 includes a communication I/F 221, a charge-eliminating high voltage controller 222, and a noncontact charge-eliminating high voltage controller 223, wherein the respective components are connected through a system bus 225. The communication I/F 221 is connected to the image forming apparatus 2 through the communication cable 229, and communication necessary for control is performed. The charge-eliminating high voltage controller 222 and the noncontact charge-eliminating high voltage controller 223 perform various controls based on a control command from the CPU 203 received through the communication cable 229. The charge-eliminating high voltage controller 222 controls elimination of charge by the contact-type charge eliminating unit 29. The noncontact charge-eliminating high voltage controller 223 controls elimination of discharge by the noncontact-type charge eliminating unit 31.

Next, a control system of the finisher 4 will be described. The finisher 4 includes a communication I/F 231, a CPU 232, a memory 233, and a sheet discharge controller 234, wherein the respective components are connected through a system bus 235. The communication I/F 231 is connected to the charge eliminating apparatus 3 through a communication cable 239, and communication necessary for control is performed. The CPU 232 performs various controls necessary for sheet discharge based on a control program stored in the memory 233. The memory 233 is a storage device storing control programs. The sheet discharge controller 234 performs control to send the conveyed sheet S to the stack tray 37 based on the instructions from the CPU 232.

Charge Eliminating Apparatus

The secondary transfer roller 19 of the present embodiment applies a negative voltage to the sheet S, by which the upper surface of the sheet S is charged negatively, and the lower surface of the sheet S is charged positively by dielectric polarization. Therefore, if the sheet S is supported on the stack tray 37 without performing the charge elimination processing, the supported sheets are mutually stuck to each other by electrostatic force. In order to prevent attachment of the sheets S by electrostatic force, according to the present embodiment, the charge on the surface of the sheet S is removed by the charge eliminating apparatus 3. The charge eliminating apparatus 3 includes two charge eliminating units, which are the contact-type charge eliminating unit 29 and the noncontact-type charge eliminating unit 31 (refer to FIG. 1).

Contact-Type Charge Eliminating Unit

Figure 3:
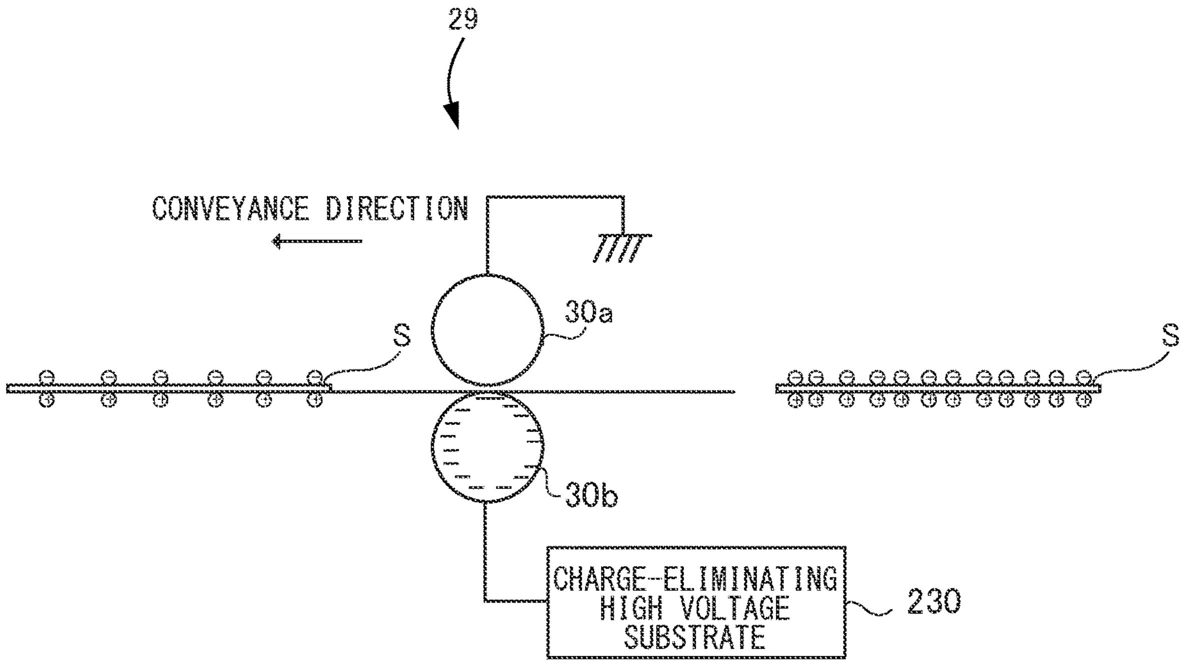
FIG. 3 is a cross-sectional view illustrating a contact-type charge eliminating unit according to the embodiment.

FIG. 3 is a cross-sectional view illustrating a charge elimination processing by the contact-type charge eliminating unit 29. The contact-type charge eliminating unit 29 includes one charge eliminating roller pair 30 that is arranged upstream of the noncontact-type charge eliminating unit 31 in the sheet conveyance direction, wherein the pair of rollers are arranged opposed to and in contact with each other. That is, the noncontact-type charge eliminating unit 31 is arranged downstream of the charge eliminating roller pair 30 in the sheet conveyance direction. The charge eliminating roller pair 30 includes the charge eliminating rollers 30*a* and 30*b*, by which the sheet S is nipped, conveyed, and eliminated of charge. The charge-eliminating high voltage controller 222 (refer to FIG. 2) uses a charge-eliminating high voltage substrate 230 serving as an example of a first voltage applying unit to apply a negative voltage to the charge eliminating roller 30*b* and to eliminate positive charge existing on the lower surface of the sheet S. The charge eliminating roller 30*a* is grounded. In the present embodiment, the charge eliminating roller pair 30 is an example of a conveying unit for conveying the sheet S, and it is also an example of a charge eliminating member that comes into contact with the sheet S being conveyed and that eliminates charge of the sheet S. Other than the charge eliminating roller pair 30, the charge eliminating apparatus 3 includes a plurality of conveyance roller pairs for conveying the sheets in the conveyance path 28.

When the positive charge existing on the lower surface of the sheet S is reduced, the negative charge existing on the upper surface of the sheet S caused by dielectric polarization is also reduced. The contact-type charge eliminating unit 29 comes into contact with the sheet S and directly applies voltage thereto, such that the charge eliminating effect is high. Meanwhile, the dispersion of surface potential of the sheet S after charge elimination is great, and elimination of charge tends to be uneven. The charge-eliminating high voltage substrate 230 for applying voltage to the charge eliminating roller pair 30 may adopt the same configuration as that of a high voltage substrate used for purposes other than eliminating charge in the image forming system 1. For example, the image forming apparatus 2 includes a high voltage substrate 101 (refer to FIG. 2) which is an example of a second voltage applying unit for applying voltage to the image developing unit and the transfer unit of the image forming unit 10. The charge-eliminating high voltage substrate 230 may adopt the same configuration as that of the high voltage substrate 101. In this case, the manufacturing costs may be cut down by adopting a common configuration for the substrate.

Noncontact-Type Charge Eliminating Unit

Figure 4A:
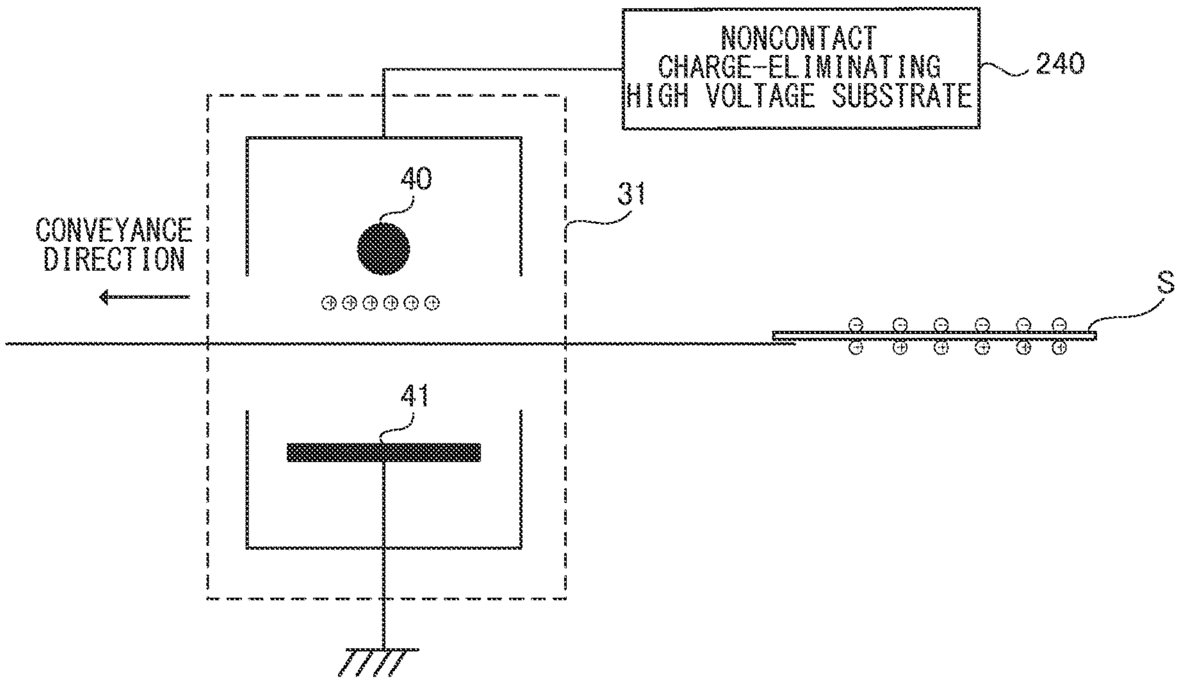
FIG. 4A is a cross-sectional view of a noncontact-type charge eliminating unit according to the embodiment, illustrating a state prior to eliminating charge of a sheet.

FIG. 4 is a cross-sectional view illustrating a charge elimination processing by the noncontact-type charge eliminating unit 31. The charge eliminating apparatus 3 according to the present embodiment is equipped with the noncontact-type charge eliminating unit 31 for regulating the surface potential of the sheet S that has become uneven by the charge elimination processing performed by the contact-type charge eliminating unit 29. The noncontact-type charge eliminating unit 31 is an example of the noncontact charge eliminating unit, and it eliminates charge of the sheet S conveyed from the charge eliminating roller pair 30 in a noncontact manner. As illustrated in FIG. 4A, the noncontact-type charge eliminating unit 31 includes an electric discharge wire 40 and a grounding electrode 41. When a positive voltage is applied to the electric discharge wire 40 from a noncontact charge-eliminating high voltage substrate 240, positive charge is generated by corona discharge.

Figure 4B:
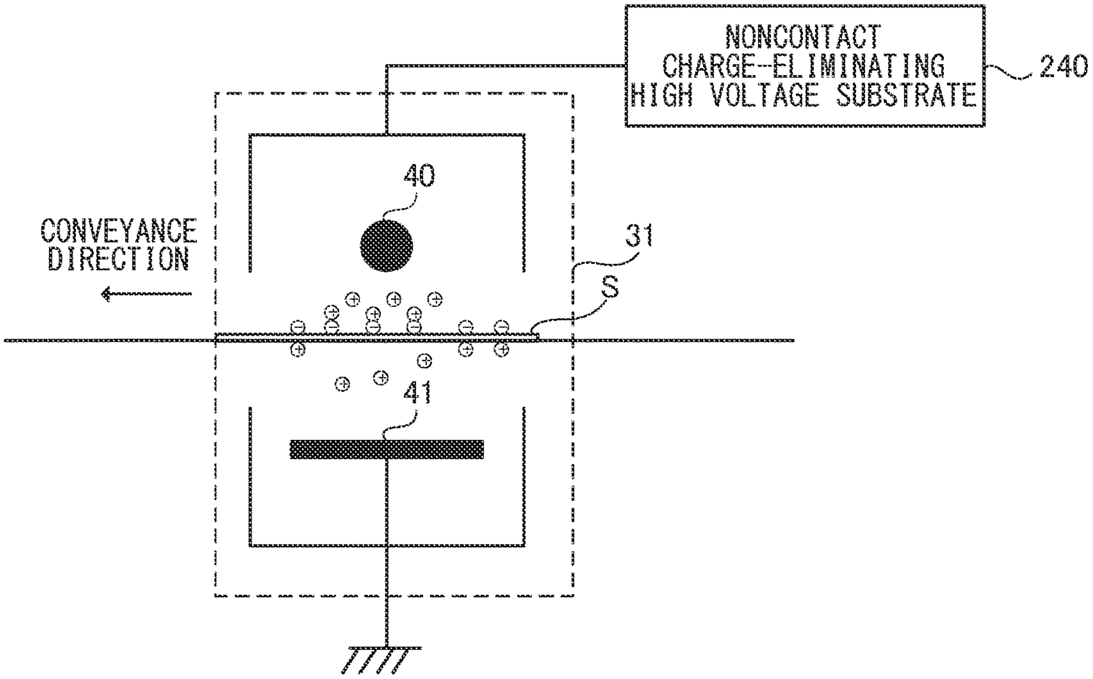
FIG. 4B is a cross-sectional view of the noncontact-type charge eliminating unit according to the embodiment, illustrating a state in which charge of the sheet is being eliminated.

As illustrated in FIG. 4B, the positive charge generated by applying voltage to the electric discharge wire 40 is attracted toward the negative charge on the upper surface of the sheet S by electrostatic force and neutralized. Thereby, the negative charge on the upper surface of the sheet S is eliminated. Further, the positive charge on the lower surface of the sheet S is eliminated by being attracted to the grounding electrode 41 set to zero potential. The charge eliminating effect on the surface of the sheet S by the noncontact-type charge eliminating unit 31 is smaller than the charge eliminating effect realized by the contact-type charge eliminating unit 29, but the surface potential of the sheet S after eliminating charge has a small dispersion, and charge elimination is performed uniformly. Therefore, the surface potential of the sheet S that has become uneven by charge elimination performed by the contact-type charge eliminating unit 29 may be regulated. Further, according to the present embodiment, an AC corotron system is adopted as the noncontact-type charge eliminating unit, but an ionizer having a static charge eliminator that generates ions may also be used.

Setting of Charge Elimination Level

Figure 5A:
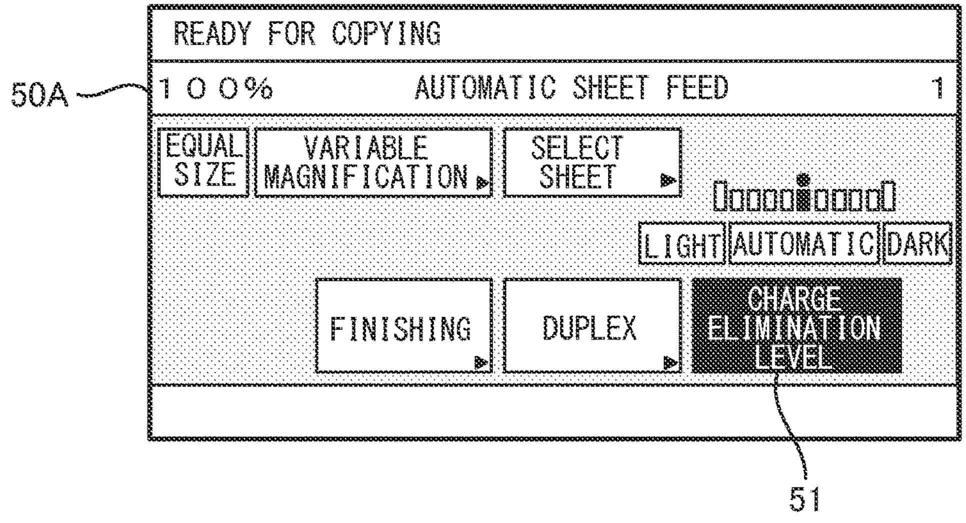
FIG. 5A is a plan view illustrating an initial screen in an operation screen according to the embodiment.
Figure 5B:
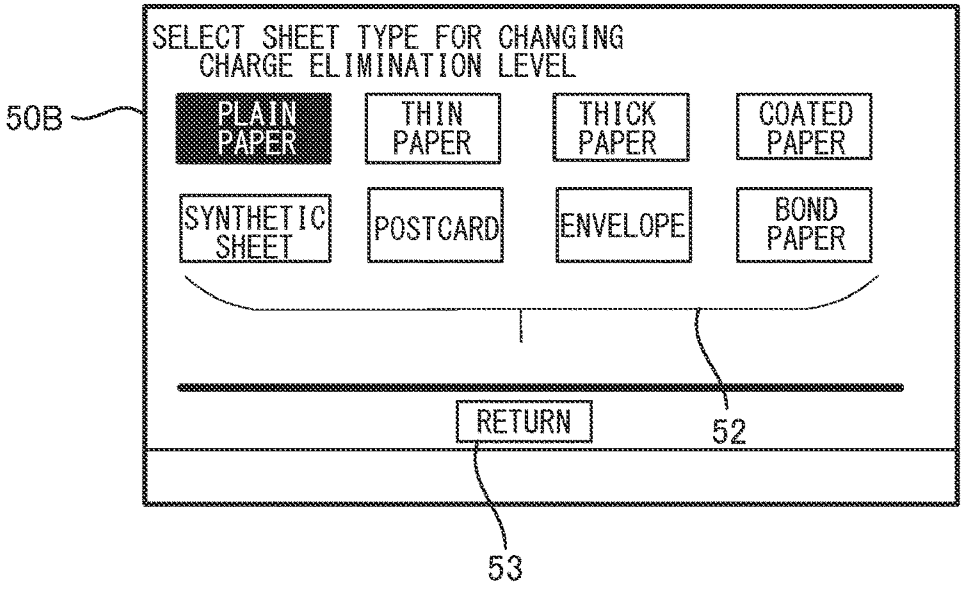
FIG. 5B is a plan view illustrating a selection screen for selecting a sheet type in the operation screen according to the embodiment.
Figure 5C:
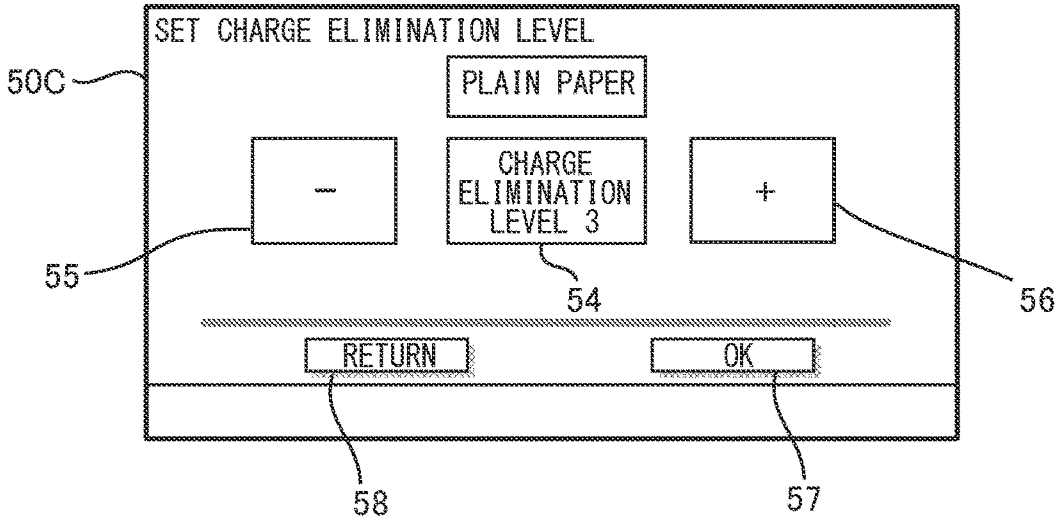
FIG. 5C is a plan view illustrating a selection screen for selecting a charge elimination level on the operation screen according to the embodiment.

In the present embodiment, a charge elimination level may be set arbitrarily from 0 to 9, that is, in 10 levels. The charge elimination level may be set for each sheet type, and for example, if the charge elimination amount requested by the user is great, a method of use may be adopted in which the charge elimination is raised according to sheet type. That is, the charge elimination level is a numerical value that indicates the charge elimination amount in a state where the charge eliminating apparatus 3 eliminates charge of the sheet. FIGS. 5A to 5C illustrate each an operation screen on which a user selects a charge elimination level. The charge elimination level is set by the user through the display 206. When the user pushes a "charge elimination level" key 51, which is a software key, on an initial screen 50A (refer to FIG. 5A), the screen is changed to a sheet type selection screen 50B (refer to FIG. 5B) by the CPU 203 for changing the charge elimination level. The term "charge elimination amount" is a set value indicating an amount of charge being eliminated from the sheet, and basically, as the voltage applied on the charge eliminating roller pair 30 increases, or as the conveyance speed of the sheet reduces, the charge elimination amount increases. However, if the voltage applied on the charge eliminating roller pair 30 becomes too high, the sheet may conversely be charged. Therefore, the voltage to be applied to the charge eliminating roller pair 30 and the conveyance speed of the sheet may preferably be determined appropriately according to the necessary charge elimination amount. Further, in the present embodiment, the term "magnitude of voltage" refers to a magnitude of absolute value of the voltage value, that is, a maximum voltage refers to a voltage whose absolute value of the voltage value is greatest.

When the user pushes a software key corresponding to sheet type of any of sheet type keys 52 on a sheet type selection screen 50B, the screen is changed to a charge elimination level selection screen 50C (refer to FIG. 5C) by the CPU 203. When the user pushes a "return" key 53 on the selection screen 50B, the screen is changed to the initial screen 50A by the CPU 203.

When the user pushes a "−" change key 55 on the charge elimination level selection screen 50C, the charge elimination level is lowered by 1, and the result is reflected on a charge elimination level display portion 54. When the user pushes a "+" change key 56, the charge elimination level is raised by 1, and the result is reflected on the charge elimination level display portion 54. When the user pushes the "OK" key 57, the CPU 203 stores the charge elimination level displayed on the charge elimination level display portion 54 in the memory 204. When the "return" key 58 is pushed on the charge elimination level selection screen 50C, the screen is changed to the sheet type selection screen 50B by the CPU 203. As described, the display 206 is an example of a setting unit for setting the charge elimination amount by the charge eliminating roller pair 30, and it is an example of an input unit through which a target charge elimination amount, i.e., charge elimination level or charge elimination amount, described below set by the user is entered.

Determination of Applied Voltage and Conveyance Speed

Based on the set charge elimination level, the CPU 203 determines a voltage value applied to the contact-type charge eliminating unit 29 and a conveyance speed by which the sheet passes the contact-type charge eliminating unit 29 during the charge elimination processing. As a premise, it is assumed that a maximum voltage value that may be output by the charge-eliminating high voltage substrate 230 is the highest voltage value that may be applied to the contact-type charge eliminating unit 29. According to the present embodiment, 5000 V is the maximum value that may be applied to the charge-eliminating high voltage substrate 230.

FIG. 6 illustrates a table illustrating a relationship among charge elimination level, charge eliminating voltages applied to the contact-type charge eliminating unit 29 and the noncontact-type charge eliminating unit 31, and conveyance speed. The present table is stored in the memory 204, wherein the CPU 203 refers to the present table when applying voltage, and instructs the application of voltage to the charge-eliminating high voltage controller 222 and the noncontact charge-eliminating high voltage controller 223 through the communication I/F 201. If the charge elimination level set through the display 206 and stored in the memory 204 is 0, charge elimination is performed by the noncontact-type charge eliminating unit 31 alone. That is, if the charge elimination level is 0, the CPU 203 will not execute the charge elimination processing by the contact-type charge eliminating unit 29. As for the sheet S such as plain paper having a small current resistance, sufficient charge elimination may be performed by carrying out the charge elimination by the noncontact-type charge eliminating unit 31 alone, such that the charge elimination level is set to 0.

In the case where the charge elimination level is set from 1 to 5, the CPU 203 applies voltage also to the contact-type charge eliminating unit 29. As the charge elimination level rises, the voltage value applied to the contact-type charge eliminating unit 29 is also gradually increased, and the charge elimination effect is enhanced. In the case where the charge elimination level is set to 5, the voltage value of the contact-type charge eliminating unit 29 is set to the upper limit value. In the case where the charge elimination level is set from 6 to 9, the voltage value of the contact-type charge eliminating unit 29 is set to the upper limit value and the voltage may not be increased further, such that the charge elimination effect is enhanced by reducing the conveyance speed in the charge elimination processing.

As described, the CPU 203 controls the voltage applied to the contact-type charge eliminating unit 29 and the sheet conveyance speed of the charge eliminating roller pair 30 based on the charge elimination level set on the display 206. Specifically, when eliminating charge of the sheet S being conveyed, if the charge elimination level is changed between 1 and 5, the CPU 203 may execute a first processing of adjusting the voltage applied to the charge eliminating roller pair 30. Further, when eliminating charge of the sheet S being conveyed, if the charge elimination level is changed between 6 and 9, the CPU 203 may execute a second processing of adjusting the sheet conveyance speed while applying voltage to the charge eliminating roller pair 30, i.e., performing the first processing.

The charge elimination level correlates with a charge elimination amount which is set as a target for eliminating charge of the sheet S, that is, a target charge elimination amount. In a case where the target charge elimination amount, i.e. charge elimination level, when eliminating charge of a sheet S being conveyed is less than a threshold value, such as less than 6 when the threshold value is 6, the CPU 203 adjusts the voltage by adjusting the voltage applied to the charge eliminating roller pair 30. The CPU 203 will not execute adjustment of the conveyance speed based on the target charge elimination amount if the target charge elimination amount in a case where the charge elimination amount when performing charge elimination of the sheet S being conveyed is less than the threshold value. Further, in a case where the target charge elimination amount, i.e., charge elimination level, when performing charge elimination of the sheet S being conveyed is equal to the threshold value or greater, such as 6 or greater, at first, the CPU 203 sets the voltage applied to the charge eliminating roller pair 30 to a maximum voltage applicable by the charge-eliminating high voltage substrate 230. Then, after setting the voltage to the maximum voltage, the adjustment of conveyance speed based on the target charge elimination amount is executed. That is, if the charge elimination level set on the display 206 is equal to or greater than the threshold value, the voltage applied to the charge eliminating roller pair 30 and the sheet conveyance speed are adjusted based on the charge elimination level.

Further, in the second processing, in a case where the target charge elimination amount, i.e., charge elimination level, is a first target charge elimination amount, i.e., first charge elimination amount, such as 7, it is assumed that the CPU 203 sets the sheet conveyance speed to a first speed, such as 450 mm/sec. At this time, in a case where the target charge elimination amount, i.e., charge elimination level, is a second target charge elimination amount, i.e., second charge elimination amount, such as 8, that is greater than the first target charge elimination amount, the CPU 203 sets the sheet conveyance speed to a second speed, such as 400 mm/sec, slower than the first speed. In this case, the voltage applied to the charge eliminating roller pair 30 is a same magnitude (−5000 V) for both the first target charge elimination amount, i.e., charge elimination level 7, and the second target charge elimination amount, i.e., charge elimination level 8. Similarly, in a case where the charge elimination level is a first charge elimination amount, for example 5, that is less than the threshold value, the CPU 203 sets the sheet conveyance speed to a first speed, such as 550 mm/sec. At this time, in a case where the charge elimination level is a second charge elimination amount, such as 8, that is equal to or greater than the threshold value, the sheet conveyance speed is set to a second speed, such as 400 mm/see, that is slower than the first speed.

Figure 7A:
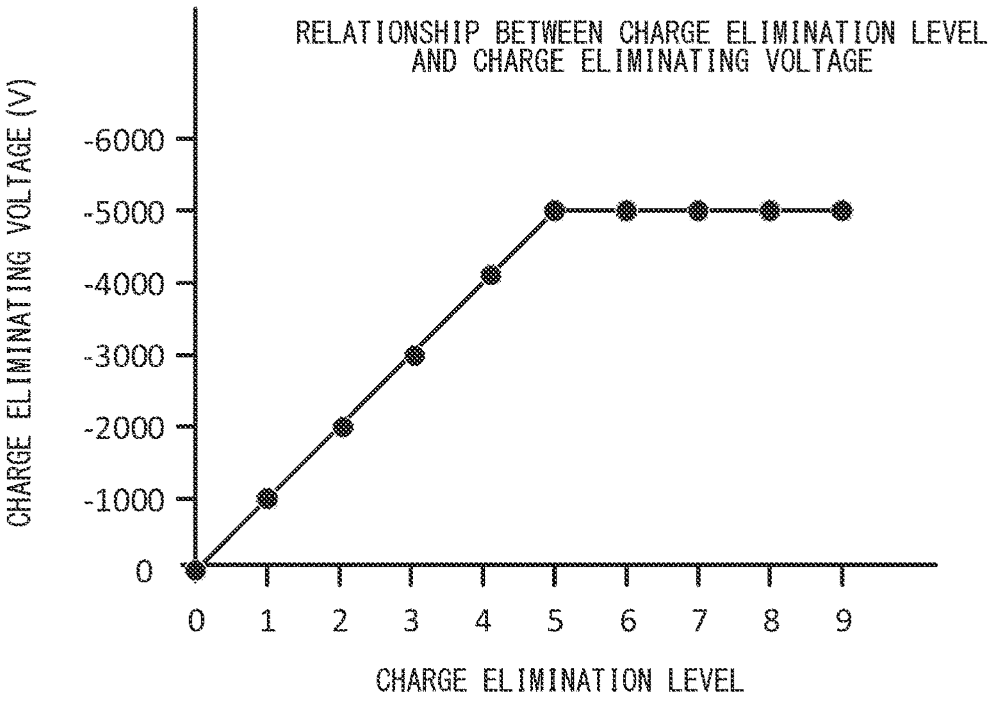
FIG. 7A is a graph illustrating a relationship between the charge elimination level and the charge eliminating voltage in the contact-type charge eliminating unit according to the embodiment.
Figure 7B:
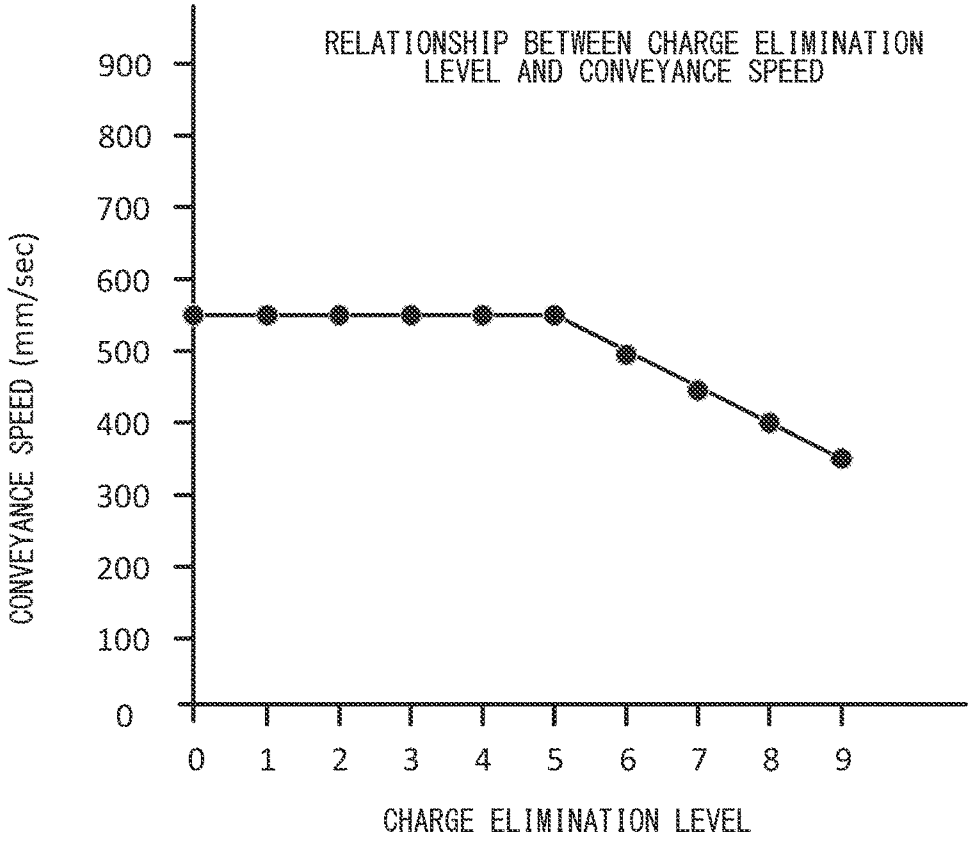
FIG. 7B is a graph illustrating a relationship between the charge elimination level and the conveyance speed according to the embodiment.

FIG. 7A illustrates a relationship between the charge elimination level and the charge eliminating voltage, and FIG. 7B illustrates a relationship between the charge elimination level and the conveyance speed. As illustrated in FIG. 7A, when the charge elimination level is from 0 to 5, the charge elimination effect is enhanced by raising the voltage by the contact-type charge eliminating unit 29, but when the charge elimination level is from 6 to 9, the conveyance speed is reduced to enhance the charge elimination effect. In the present embodiment, the voltage value applied to the noncontact-type charge eliminating unit 31 is fixed to 800 V, regardless of the charge elimination level, but the voltage value to be applied to the noncontact-type charge eliminating unit 31 may be varied arbitrarily according to the charge elimination level.

Figure 8:
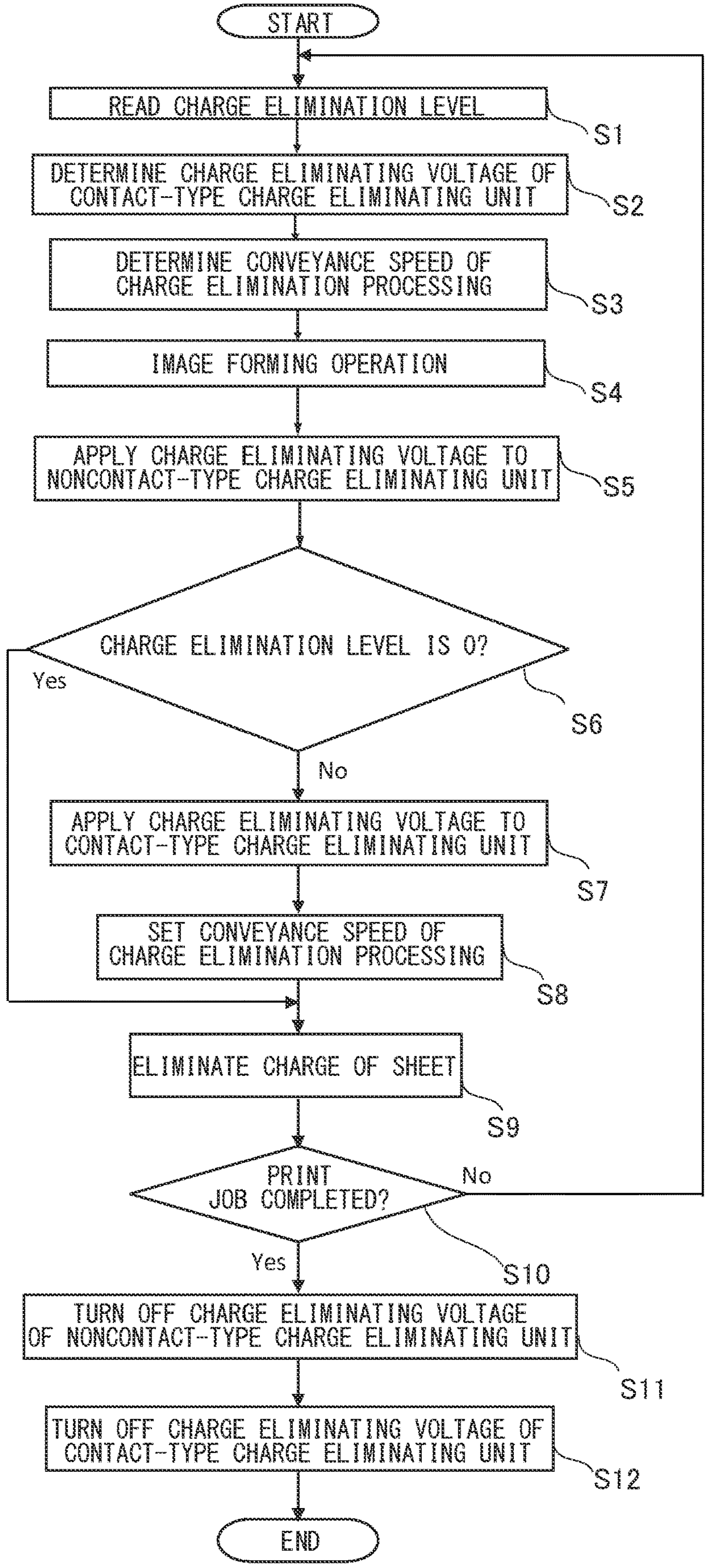
FIG. 8 is a flowchart illustrating a procedure of executing a charge elimination processing using the charge eliminating apparatus according to the embodiment.

Next, a processing of a case where the charge elimination processing is executed using the charge eliminating apparatus 3 described above will be described using the flowchart illustrated in FIG. 8. Prior to starting of the print job, the user sets the charge elimination level on the charge elimination level selection screen 50C, and the CPU 203 stores the set charge elimination level in the memory 204.

When the print job is started, the CPU 203 reads the charge elimination level from the memory 204 (step S1). Based on the charge elimination level read from the memory 204, the CPU 203 determines a charge eliminating voltage value of the contact-type charge eliminating unit 29 according to a table storing the charge eliminating voltage and the conveyance speed illustrated in FIG. 6 (step S2), and determines the conveyance speed of the charge elimination processing (step S3). In the present embodiment, a step for determining the charge eliminating voltage value and a step for determining the conveyance speed are executed sequentially, but the steps may be executed in the opposite order, or they may be executed simultaneously in parallel.

Thereafter, the CPU 203 performs an image forming operation (step S4). In the image forming operation, as described above, the CPU 203 executes the image forming operation of the conveyance of the sheet S from the sheet feed decks 11 and 12 to the end of the fixing step by the second fixing unit 23. The CPU 203 applies a charge eliminating voltage to the noncontact-type charge eliminating unit 31 (step S5).

The CPU 203 determines whether the read charge elimination level is 0 (step S6). If it is determined that the charge elimination level being read is not 0 (step S6: No), the CPU 203 applies the charge eliminating voltage determined in step S2 to the contact-type charge eliminating unit 29 (step S7). The CPU 203 sets the conveyance speed from the conveyance paths 24 and 25 to the conveyance path 28, that is, the conveyance speed by the charge eliminating roller pair 30 in the charge elimination processing, to a conveyance speed determined in step S3 (Step S8).

After setting the conveyance speed, or when it is determined that the charge elimination level being read is 0 (step S6: Yes), the CPU 203 causes the sheet S to pass through while having voltage applied to the contact-type charge eliminating unit 29 and the noncontact-type charge eliminating unit 31. In other words, the charge elimination processing of eliminating charge of the sheet S is executed (step S9). After the charge elimination processing is completed, the CPU 203 determines whether the print job has been completed (step S10).

If it is determined that the print job has not been completed (step S10: No), the CPU 203 executes the processing starting from step S1 again for the subsequent sheet S. When it is determined that the print job has been completed (step S10: Yes), the CPU 203 turns off the voltage of the noncontact-type charge eliminating unit 31 (step S11), turns off the voltage of the contact-type charge eliminating unit 29 (step S12), and ends the print job. In the present embodiment, the voltage of the noncontact-type charge eliminating unit 31 is turned off before the voltage of the contact-type charge eliminating unit 29 is turned off, but the steps may be executed in the opposite order, or they may be executed simultaneously in parallel.

As described above, according to the charge eliminating apparatus 3 of the present embodiment, both the voltage to be applied to the charge eliminating roller pair 30 and the sheet conveyance speed are controlled based on the charge elimination level being set. Therefore, if the charge elimination amount that is considered necessary according to the physical property of the sheet S is great, there may be a risk that the charge of the sheet S may not be sufficiently eliminated by the charge elimination processing performed by merely adjusting the applied voltage, whereas if the charge may not be sufficiently eliminated by the applied voltage alone, the conveyance speed may be reduced to enhance the charge elimination effect. Since the charge elimination amount that may be eliminated when eliminating charge of the sheet S may be increased, the conveyance failure or the stacking failure caused by electrostatic attraction may be suppressed.

According to the present embodiment, in a case where the target charge elimination amount, i.e., charge elimination level, of performing elimination of charge of the sheet S being conveyed is less than a threshold value, such as less than 6, voltage is adjusted by executing the first processing. In a case where the target charge elimination amount, i.e., charge elimination level, of performing elimination of charge of the sheet S being conveyed is equal to the threshold value or greater, such as 6 or greater, both the first processing and the second processing are executed. Thereby, in a case where the target charge elimination amount, i.e., charge elimination level, is low, adjustment of applied voltage is executed as in the conventional technique, and in a case where the target charge elimination amount, i.e., charge elimination level, is high, adjustment of applied voltage alone is not sufficient, such that the conveyance speed is slowed down to enhance the charge elimination effect.

According further to the present embodiment, when executing the second processing, the voltage adjusted in the first processing is set to a maximum voltage applicable to the charge eliminating roller pair 30 by the charge-eliminating high voltage substrate 230. Therefore, if the target charge elimination amount, i.e., charge elimination level, is low, adjustment of applied voltage is executed as in the conventional technique, and the voltage is raised to the maximum applicable voltage, and only when elimination of charge is still not sufficient, the conveyance speed is slowed down, such that high productivity may be maintained.

According to the present embodiment described above, the setting unit is the display 206, and the target charge elimination amount, i.e., charge elimination level, is set by the user entering the information on the screen of the display 206, but the present invention is not limited thereto. For example, a setting unit 203*a* (refer to FIG. 2) for setting the target charge elimination amount, i.e., charge elimination level, according to the type of the sheet S or the applied voltage at the transfer unit may be provided, and the CPU 203 may execute the function of the setting unit 203*a*. In that case, a charge elimination controller 203*b* (refer to FIG. 2) as an example of a controller for controlling the voltage applied to the charge eliminating roller pair 30 and the sheet conveyance speed based on the charge elimination amount set by the setting unit 203*a* may be provided, and the CPU 203 may execute the functions of the charge elimination controller 203*b*.

Further according to the present embodiment, the applied voltage of the contact-type charge eliminating unit 29 is adjusted according to the first processing, but the present technique is not limited thereto, and the applied voltage of the noncontact-type charge eliminating unit 31 may be adjusted. For example, in a case where the contact-type charge eliminating unit 29 is not provided, or in a case where the voltage adjustment of the contact-type charge eliminating unit 29 may not be performed, the applied voltage of the noncontact-type charge eliminating unit 31 is set to be adjusted. Further in that case, if the voltage value of the noncontact-type charge eliminating unit 31 reaches the upper limit value, the second processing of lowering the conveyance speed is executed.

According to the present embodiment, a case has been illustrated where the conveyance speed is set to a fixed speed regardless of the change of charge elimination level if the charge elimination level is 5 or below, and the applied voltage is set to a fixed value regardless of the change of charge elimination level if the charge elimination level is 6 or higher, but the present embodiment is not limited thereto. For example, in a case where the charge elimination level is changed, it may be possible to adjust bot the applied voltage and the conveyance speed. In that case, for example, adjustment may be executed according to the matter to be prioritized, such as when prioritizing productivity, the applied voltage may be raised and the conveyance speed may be set high, and when prioritizing reduction of power consumption, the applied voltage may be reduced and the conveyance speed may be set slow.

According to the present invention, the charge elimination amount that may be eliminated when eliminating charge of a sheet or the charge adjustment amount of the charge of the sheet may be increased.

OTHER EMBODIMENTS

According to the embodiment described above, a charge eliminating apparatus 300 for eliminating charge of the sheet S has been described, wherein the charge eliminating apparatus 300 has a function as a charge adjusting apparatus for adjusting a state of charge of the sheet S by supplying charge to the sheet S through a charge eliminating roller pair 30 serving as a charge supplying member. The charge adjusting apparatus does not necessarily reduce the amount of charge, that is, not necessarily eliminate charge, of the sheet S. For example, in a state where the sheets S are stacked after processing by the charge adjusting apparatus has been performed, the amount of charge on upper and lower surfaces of the sheets S may be adjusted such that the surfaces mutually opposed to each other of the stacked sheets are charged to the same polarity. Specifically, the charge adjusting apparatus applies voltage such that the electrostatic polarity of the sheet surface is reversed every other sheet of the plurality of sheets. In that case, the sticking together of sheets by electrostatic force may be reduced by charging the mutually opposed surfaces of stacked sheets to the same polarity. In that case, the charge eliminating roller pair 30 functions as a charge adjusting member, i.e., charge adjustment roller pair, for adjusting the charge of sheets.

Even according to the charge adjusting apparatus, the control of the above-mentioned embodiment may be applied. In that case, the display 206 is an example of a setting unit for setting the charge adjustment amount by the charge eliminating roller pair 30. That is, both the voltage applied to the charge eliminating roller pair 30 and the sheet conveyance speed may be controlled based on the charge adjustment level, i.e., charge adjustment amount, set by the display 206. Specifically, in a case where the voltage necessary for adjusting the charge of the sheet is great, both the voltage applied to the charge eliminating roller pair 30 and the sheet conveyance speed are controlled. Thereby, in a case where the charge of the sheet may not be adjusted by adjusting the applied voltage alone, the conveyance speed may be reduced to enhance the effect of charge adjustment. As described, even according to the charge adjusting apparatus for adjusting the state of charge of the sheet S, similar to the embodiment described above, the conveyance failure or the stacking failure caused by electrostatic attraction may be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-070974, filed Apr. 24, 2023 and Japanese Patent Application No. 2024-010581, filed Jan. 26, 2024, which are hereby incorporated by reference herein in their entirety.

What is claimed is:

1. A charge eliminating apparatus comprising:

a charge eliminating roller pair configured to convey a sheet and eliminate charge of the sheet;

a setting unit configured to set a charge elimination amount by the charge eliminating roller pair; and a controller configured to control a sheet conveyance speed of the charge eliminating roller pair based on the charge elimination amount set by the setting unit, wherein the controller is configured to:

in a state where the charge elimination amount set by the setting unit is a first charge elimination amount, set the sheet conveyance speed of the charge eliminating roller pair to a first speed; and in a state where the charge elimination amount set by the setting unit is a second charge elimination amount that is greater than the first charge elimination amount, set the sheet conveyance speed of the charge eliminating roller pair to a second speed that is slower than the first speed.

2. The charge eliminating apparatus according to claim 1, wherein:

in a state where the charge elimination amount set by the setting unit is less than a threshold value, the controller is configured to adjust a voltage applied to the charge eliminating roller pair based on the charge elimination amount without executing adjustment of the sheet conveyance speed based on the charge elimination amount, and in a state where the charge elimination amount set by the setting unit is greater than the threshold value, the controller is configured to adjust the sheet conveyance speed of the charge eliminating roller pair based on the charge elimination amount.

3. The charge eliminating apparatus according to claim 2, further comprising:

a voltage applying unit configured to apply the voltage to the charge eliminating roller pair, wherein, in a state where the charge elimination amount set by the setting unit is greater than the threshold value, the controller is configured to set the voltage applied to the charge eliminating roller pair to a maximum voltage applicable by the voltage applying unit.

4. The charge eliminating apparatus according to claim 1, wherein the controller is configured to set a voltage applied to the charge eliminating roller pair to a same magnitude, in a state where the charge elimination amount set by the setting unit is the first charge elimination amount and in a state where the charge elimination amount set by the setting unit is the second charge elimination amount.

5. The charge eliminating apparatus according to claim 1, wherein the setting unit is an input unit through which a user enters the charge elimination amount.

6. The charge eliminating apparatus according to claim 1, wherein the setting unit is configured to set the charge elimination amount based on a sheet type.

7. The charge eliminating apparatus according to claim 1, further comprising a noncontact charge eliminating unit arranged downstream of the charge eliminating roller pair in a sheet conveyance direction, and configured to eliminate charge of the sheet conveyed by the charge eliminating roller pair in a noncontact manner.

8. An image forming system comprising:

an image forming apparatus configured to form an image on a sheet; and the charge eliminating apparatus according to claim 1 configured to receive and eliminate charge of the sheet on which the image has been formed by the image forming apparatus.

9. The image forming system according to claim 8, wherein:

the image forming apparatus includes an image forming unit configured to form a toner image on the sheet, and a first substrate configured to apply a voltage to the image forming unit, and the charge eliminating apparatus includes a second substrate configured to apply a voltage to the charge eliminating roller pair and having a same configuration as the first substrate.

10. A charge adjusting apparatus comprising:

a charge adjusting roller pair configured to convey a sheet and adjust charge of the sheet;

a setting unit configured to set a charge adjustment amount by the charge adjusting roller pair; and a controller configured to control a sheet conveyance speed of the charge adjusting roller pair based on the charge adjustment amount set by the setting unit, wherein the controller is configured to:

in a state where the charge adjustment amount set by the setting unit is a first charge adjustment amount, set the sheet conveyance speed of the charge adjusting roller pair to a first speed; and in a state where the charge adjustment amount set by the setting unit is a second charge adjustment amount that is greater than the first charge adjustment amount, set the sheet conveyance speed of the charge adjusting roller pair to a second speed that is slower than the first speed.

* * * * *